(12) United States Patent
Björck et al.

(10) Patent No.: US 8,434,582 B2
(45) Date of Patent: May 7, 2013

(54) ALL WHEEL DRIVE SYSTEM

(75) Inventors: Per-Gunnar Björck, Trollhättan (SE);
Michael Larsson, Vänersborg (SE);
Björn Scherdin, Trollhättan (SE)

(73) Assignee: GM Global Technology Operations LLC, Detroit, MI (US)

( * ) Notice: Subject to any disclaimer, the term of this patent is extended or adjusted under 35 U.S.C. 154(b) by 707 days.

(21) Appl. No.: 12/525,373

(22) PCT Filed: Jan. 29, 2008

(86) PCT No.: PCT/EP2008/000666
§ 371 (c)(1),
(2), (4) Date: Mar. 31, 2010

(87) PCT Pub. No.: WO2008/092631
PCT Pub. Date: Aug. 7, 2008

(65) Prior Publication Data
US 2010/0232874 A1    Sep. 16, 2010

(30) Foreign Application Priority Data
Jan. 31, 2007  (GB) .................................. 0701848.4

(51) Int. Cl.
*B60K 17/00*   (2006.01)
(52) U.S. Cl.
USPC .................... 180/383; 403/359.1; 403/359.5; 180/384
(58) Field of Classification Search ................. 180/383, 180/384, 385; 403/359.1, 359.5, 359.6
See application file for complete search history.

(56) References Cited

U.S. PATENT DOCUMENTS 3,326,580 A * 6/1967 Munier et al. .................. 285/27
3,367,139 A * 2/1968 Ristau ............................ 464/144
3,637,239 A * 1/1972 Daniel ............................ 285/93
(Continued)

FOREIGN PATENT DOCUMENTS

| DE | 3941107 A1 | 6/1991 |
| DE | 102005036939 A1 | 2/2006 |
| DE | 102006025692 A1 | 1/2007 |
| GB | 2277911 A | 11/1994 |

OTHER PUBLICATIONS

International Searching Authority, International Search Report for Application No. PCT/EP2008/000666, dated May 20, 2008.

*Primary Examiner* — Drew Brown
*Assistant Examiner* — Barry Gooden, Jr.
(74) *Attorney, Agent, or Firm* — Ingrassia Fisher & Lorenz, P.C.

(57) ABSTRACT

A drive system and an interconnection unit are provided for an all wheel drive vehicle. The drive system includes, but is not limited to a power take-off unit, a propshaft and a rear drive module. The power take-off unit being adapted to be attached to a vehicle's powertrain, and the propshaft being adapted to transmit drive to the rear drive module. The propshaft and the power take-off unit are connected by a joint for transmitting drive force from the power take-off unit to the propshaft, and the joint between the power take-off unit and the propshaft includes, but is not limited to a female-male engagement. The female and male engagement portions are non-rotatable in relation to each other when the joint is engaged.

6 Claims, 2 Drawing Sheets

U.S. PATENT DOCUMENTS

| | | | | |
|---|---|---|---|---|
| 4,132,422 A | * | 1/1979 | Sankey et al. | 277/635 |
| 4,135,646 A | * | 1/1979 | Shaw | 222/144 |
| 4,813,522 A | * | 3/1989 | Fujioka et al. | 192/70.2 |
| 4,867,001 A | | 9/1989 | Sasaki et al. | |
| 5,527,225 A | * | 6/1996 | Dick | 474/12 |
| 5,845,945 A | * | 12/1998 | Carstensen | 285/321 |
| 5,881,856 A | * | 3/1999 | Prater | 192/48.1 |
| 6,241,616 B1 | * | 6/2001 | Lightcap | 464/162 |
| 6,257,798 B1 | | 7/2001 | Wormsbaecher | |
| 6,467,565 B1 | * | 10/2002 | Handa et al. | 180/383 |
| 6,582,151 B2 | * | 6/2003 | Hopson | 403/359.5 |
| 6,698,563 B2 | | 3/2004 | Handa et al. | |
| 7,051,619 B1 | * | 5/2006 | Morgillo | 74/607 |
| 7,134,410 B2 | * | 11/2006 | Gaessler et al. | 123/90.24 |
| 7,677,984 B2 | * | 3/2010 | Hahn et al. | 464/182 |
| 2001/0038772 A1 | * | 11/2001 | Wormsbaecher | 403/359.6 |
| 2003/0146591 A1 | | 8/2003 | Ouchi et al. | |
| 2004/0214646 A1 | | 10/2004 | Chiou | |
| 2006/0283654 A1 | | 12/2006 | Krisher | |
| 2007/0123357 A1 | | 5/2007 | Hahn et al. | |

* cited by examiner

ALL WHEEL DRIVE SYSTEM

CROSS-REFERENCE TO RELATED APPLICATIONS

This application is a U.S. National-Stage entry under 35 U.S.C. §371 based on International Application No. PCT/EP2008/000666, filed Jan. 29, 2008, which was published under PCT Article 21(2) and which claims priority to British Application No. 0701848.4, filed Jan. 31, 2007, which are all hereby incorporated in their entirety by reference.

TECHNICAL FIELD

The present invention relates to a drive system for an all wheel drive vehicle. The drive system comprising a power take-off unit, a propshaft and a rear drive module. The power take-off unit being adapted to be attached to a vehicle's powertrain, and the propshaft being adapted to transmit drive to the rear drive module. The propshaft and the power take-off unit are connected by a joint for transmitting drive force from the power take-off unit to the propshaft.

BACKGROUND

An all wheel drive (AWD) system of a vehicle usually comprises a power take-off unit, a propshaft and a rear drive module. The power take-off unit is attached to the powertrain (i.e., the engine and the transmission), and transmits the driving force from the transmission to the rear wheels. The driving force to the rear wheels is transmitted, as stated above, from the engine to the power take-off unit and further to the propshaft and the rear drive module, which distributes the driving force to the rear wheels of the vehicle.

The means for transmitting the driving force from the power take off unit to the propshaft is usually established by an output shaft of the power take-off unit being connected to the propshaft. This connection is commonly established by providing the connecting ends of the propshaft and the output shaft, respectively, with a flange. The connection is thereafter established by interconnecting the flanges with several bolts.

A vehicle of today is an advanced construction and the available space for the different components constituting the vehicle is limited. Therefore, there exists a risk of conflicts between the different parts of the vehicle. Due to the highly competitive environment in the vehicle industry, it is desirable to be able to assemble a vehicle in a fast manner and with high quality. Therefore, since conflicts between different parts tend to increase the complexity of assembly and hence increase the time necessary for assembly, and also potentially lower the quality of the assembled vehicle, there exists a need to have certain clearances between the different parts of the vehicle during the assembly operation. The avoidance of conflicts with other components of the vehicle may be especially relevant for heavy components such as an all wheel drive system, since heavy components are more difficult to guide and fit into place for an assembler. Furthermore, also because it is time consuming, and also because it is potentially dangerous for the assembler, there is a need that the assembler does not have to access components hidden behind other components when assembling the vehicle.

A power take-off unit with a flange and bolt connection of the propshaft and the output shaft of the power take-off unit for an all wheel drive vehicle does not always meet these needs.

Therefore, it is at least one aim of the present invention to provide an all wheel drive system for a vehicle where the power take-off unit and the interconnection between the propshaft and the output shaft of the power take-off unit meets these needs (i.e., that provides sufficient clearance to other components when assembling the vehicle), that is able to limit the time needed to assemble it, and also that does not require hidden parts of the interconnection to be accessed for assembling purposes. In addition, other aims, desirable features, and characteristics will become apparent from the subsequent summary and detailed description, and the appended claims, taken in conjunction with the accompanying drawings and this background.

SUMMARY

According to a first embodiment a drive system is provided for an all wheel drive vehicle, said drive system comprising a power take-off unit, a propshaft and a rear drive module, said power take-off unit being adapted to be attached to a vehicle's powertrain, and said propshaft being adapted to transmit drive to the rear drive module, wherein the propshaft and the power take-off unit are connected by a joint for transmitting drive force from the power take-off unit to the propshaft, wherein said joint between said power take-off unit and said propshaft comprises a female-male engagement, wherein the female and male engagement portions are non-rotatable in relation to each other when said joint is engaged.

An advantage of the inventive concept is that a female-male engagement may be designed with a smaller diameter than the prior known solutions with flanges and bolts. A smaller diameter of the components constituting the joint is more space-efficient and reduces the risk of conflicts with other components of the vehicle. It is also possible to plug the male engagement portion into the female engagement portion without having to coax it past other components of the vehicle. This reduces the complexity of assembling and may consequently reduce the time needed to assemble the vehicle. This may especially be relevant for heavy components such as all wheel drive systems, and components thereof. Furthermore, since less guiding and fitting of the components past other components of the vehicle is required, the present invention provides for the possibility of automated assembling of the propshaft to the power take-off unit.

It is further possible to design a female-male engagement joint without bolts or other fastening means for locking the components constituting the joint in a non-rotatable manner in relation to each other. Thereby, by not having to assemble any extra fastening means, it is possible to even further reduce the time needed to assemble the all wheel drive system of a vehicle and, further, there is no need to access components hidden behind other parts of the vehicle for assembling purposes. Another advantage with designing a female-male engagement that does not need to be secured by bolts is that the bolts may not be loosened during use of the vehicle. This increases the safety for the user of the vehicle.

Preferably, the female engagement portion is integral with the driven member of the power take-off unit.

It may be beneficial to provide the female engagement portion of the male-female engagement as a bored axle in the power take-off unit. This bored axle may preferably be integral with the driven member of the power take-off bevel gearset. By designing the connection portion of the power take-off unit as an integral portion, the length of the power take-off unit may be reduced, which is beneficial in terms of creating clearances to other components of the vehicle. Hence, the assembling or loading of the power take-off unit on the front cradle is simplified since the power take-off unit does not have to be coaxed past other components of the vehicle. This simplified loading of the power take-off unit also provides for possible automated assembling of the power take-off unit to the vehicle.

Suitably, the male engagement portion is a stub shaft of the propshaft.

A stub shaft of the propshaft may then function as the male engagement portion and be inserted into the bored axle of the power take-off unit for engaging the male-female engagement. The plug in connection provides for a simplified assembly and it is not necessary to fasten the two engagement portions to each other with bolts, as in the previously known art. Furthermore, the plug in connection with an integrally formed bored axle in a power take-off unit and a stub shaft that is insertable into the bored axle may have a smaller diameter than a bolt and flange connection, which is beneficial in terms of clearance to other components of the vehicle.

Preferably, the male engagement portion of said female-male engagement is provided with splines, and the female engagement portion is provided with a corresponding profile for establishing said non-rotatable locking engagement.

Providing the engagement portions of the female-male engagement with splines is beneficial in order to establish a joint where the portions of the joint are not rotatable in relation to each other, when the joint is engaged. The joint is thereby capable of transmitting drive force from a power take-off unit to a propshaft and further to a rear drive module.

Preferably, a snap ring fitting is provided to prevent axial displacement, in substantially the longitudinal direction of said vehicle, of said male and female engagement portions of the joint, in relation to one another.

For functioning and safety purposes, it may be preferred that the female-male engagement portions are prevented from axial movement in relation to each other, once the all wheel drive system is assembled. A snap ring that holds the engagement portions at the desired relative positions may therefore be beneficial. Utilizing a snap ring for prevention of axial movement also has assembling benefits since no bolts or other fastening means have to be tightened by the assembler. This strengthens the benefits of the plug in connection even further.

Preferably, the snap ring is arranged at the male engagement portion of the joint, and at least one first groove is provided at the female engagement portion, wherein axial displacement in relation to one another of the female and male engaging portions of the joint is prevented by cooperation of the snap ring and said first groove.

The snap ring provided at the male engagement portion may then snap into the groove provided at the female engagement portion when the joint is engaged and thereby prevent relative axial movement between the male and female engagement portions during use of the vehicle.

It may be suitable that a second groove is provided at the female engagement portion, wherein said second groove is axially spaced from said first groove, and positioned rearwards of said first groove in said vehicle's longitudinal direction, wherein said second groove prevents further axial displacement of the female and male engagement portions if said snap ring is axially displaced past said first groove, in the rearward direction of said vehicle's longitudinal direction.

A second groove at the female engagement portion, provided rearwards of the first groove may function as an extra safety feature. If the snap ring should be forced out of the first groove (i.e., compressed and dislocated), by the male engagement portion moving in the direction that disengages the female-male engagement, the snap ring will expand into and engage the second groove when it reaches the position of the second groove. Thereby, the female and male portions of the engagement or joint will still be engaged, but with another relative position.

It may further be suitable that the lateral play between said male and said female engagement portions is larger when the snap ring of said male engagement portion is positioned at said second groove of said female engagement portion.

An increased lateral or radial play between the female and male engagement portions when the snap ring is held by the second groove may function as an alarm system for a driver of the vehicle. The increased lateral play will lead to vibrations of the joint, and eventually also to noise, which alerts the driver that the joint is malfunctioning.

It may also be preferred that the overlap of the female and male engagement portions is sufficiently large so that the female-male engagement does not loose its engagement even in the worst tolerance and powertrain motion situation in case the snap ring should break.

Preferably, an o-ring is provided at said male engagement portion.

When the female-male engagement is engaged, the o-ring may be slightly compressed between the male and the female engagement portions. This slightly compressed o-ring may serve dual purposes. Firstly, it may seal the engagement so that dirt does not come into the engagement and lowers its functional possibilities. Secondly, it may have a vibration dampening function, which reduces the vibrations and noise coming from the joint during use of the vehicle.

The drive system described above is preferably used in an all wheel drive vehicle.

The described drive system, and the male-female engagement for joining together a power take-off unit and a propshaft, is beneficial to utilize in an all wheel drive vehicle.

According to another aspect of an embodiment of the present invention relates to an interconnection unit for use in a drive system as described above.

The interconnection unit is the engagement or joint constituted by the male and female engagement portions as described above. The female engagement portion may preferably be integrally designed with the driven member of the power take-off bevel gearset, for reducing the length of the power take-off unit in the direction of other components, which creates a desired clearance between the power take-off unit and other components of the vehicle. The clearance of the power take-off unit to other components of the vehicle is beneficial in terms of simplified assembly of the power take-off unit. The male engagement portion is preferably designed as a stub shaft of the propshaft, which may be received in the female engagement portion.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
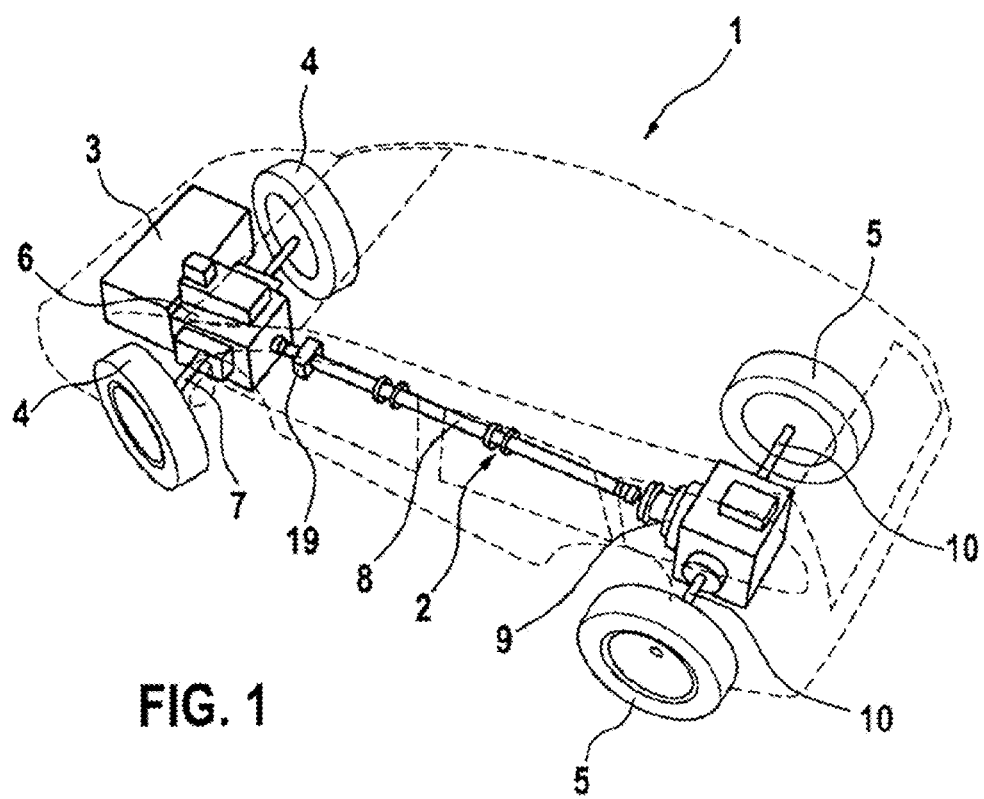
FIG. 1 is a schematic view, in perspective, of a vehicle with an all wheel drive system.

In FIG. 1 is a schematic vehicle 1 shown. The vehicle 1 is equipped with an all wheel drive system 2, an engine 3, front wheels 4 and rear wheels 5. The all wheel drive system comprises a power take-off unit 6 at its front portion, half-shafts 7 extending to the front wheels 4, respectively, and a propshaft 8 extending substantially in the longitudinal direction of the vehicle from the power take-off unit 6 to a rear drive module 9. The propshaft also comprises a constant velocity joint 19. The rear drive module 9 is attached to the rear wheels 5 by half-shafts 10, respectively, via a torque transfer device and a differential (not shown).

Figure 2:
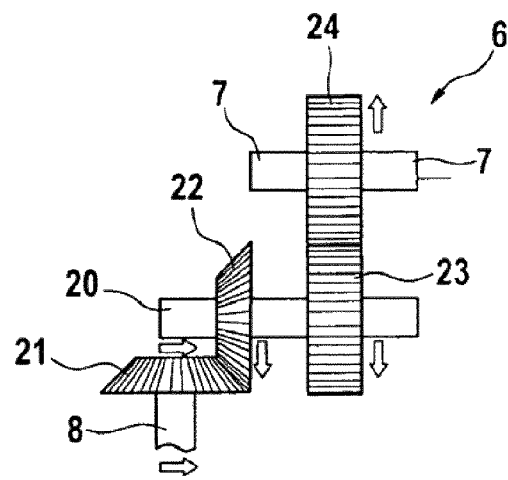
FIG. 2 is a schematic view of a power take-off unit.

In use, as may be seen schematically in FIG. 2, the engine 3 produces a drive force that is transmitted to the power take off-unit by a transmission 20. The power take-off unit further transmits the force to the propshaft 8 (e.g., by cooperating gears 21 and 22). Also in FIG. 2 is shown the half-shaft 7 transmitting force to the front wheels 4 and cooperating gears 23, 24.

Figure 3:
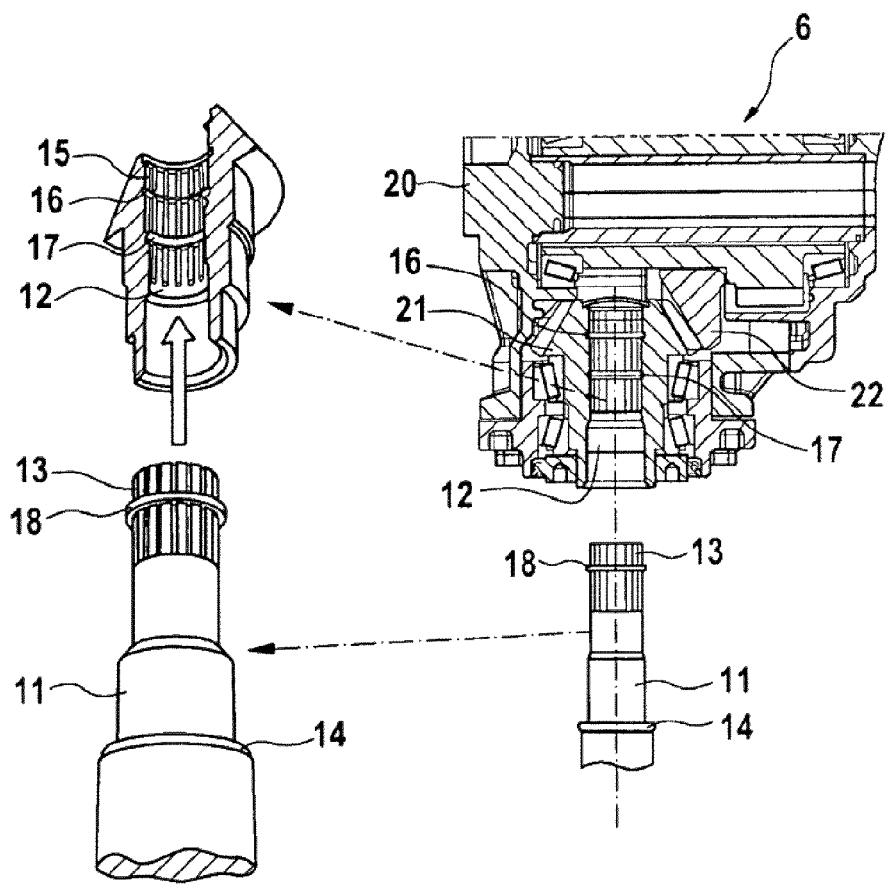
FIG. 3 is a view of the connection between a power take-off unit, shown partially and in cross-section, and a propshaft, shown partially and in side view, in accordance with an embodiment of the present invention.

In FIG. 3 is shown a cross-section of the portion of the power take-off unit 6 that is adapted to be attached to the propshaft 8, and a stub shaft 11 of the propshaft 8 is shown in side view. The output shaft of the power take-off unit is constituted of a recess or receiving portion in the form of a bored axle 12. In this embodiment, the stub shaft 11 is provided at the constant velocity joint 19 of the propshaft 8. The bored axle 12 and the stub shaft 11 constitutes an interconnection unit and are adapted to be engaged to form a non-rotatable joint in relation to each other.

As may further be seen in FIG. 3, the stub shaft 11 is provided with splines 13 along its circumference. At the front portion of the stub shaft 11, seen in the longitudinal direction of a vehicle, and encircling the splines, is a snap ring 18 provided. At the rear portion of the stub shaft 11 is an o-ring 14 provided.

The output shaft of the power take-off 6 unit is, as stated above, constituted of a bored axle 12. The bored axle 12 is provided with recesses or splines 15, which are corresponding to the splines 13 of the stub shaft 11. The bored axle 12 is further provided with a first groove 16 and a second groove 17. As may also be seen in FIG. 3, the diameter of the bored axle 12 is slightly larger rearwards of the second groove 17 than in front of the second groove 17.

When assembling a vehicle, the power take-off unit is usually attached to the powertrain (i.e., the engine and transmission, prior to being loaded on the front cradle of the vehicle). The commonly used output shaft, with a bolt and flange connection, of the power take-off unit may then come into conflict with, for example, the vehicle's frame or steering rack. Furthermore, when the output shaft of the power take-off unit is to be connected to the propshaft, some of the bolts may also be hidden behind (e.g., the steering rack), and it is difficult for the assembler to tighten the bolts.

When assembling the all wheel drive system in accordance with an embodiment of the present invention, the power take off-unit may instead be lowered onto the front cradle of the vehicle without having to be coaxed past other components of the vehicle, due to the integrally formed bored axle 12 which reduces the length of the power take-off unit. The stub shaft 11 of the propshaft 8 may thereafter be inserted or plugged into the bored axle 12 of the power take-off unit 6. The corresponding spline profiles of the stub shaft 11 and the bored axle 12 forms a non-rotatable joint which may transfer the drive force from the engine to the rear drive module 9, via the power take-off unit 6 and the propshaft 8.

The snap ring 18 becomes compressed during insertion of the stub shaft 11 into the bored axle 12, and when the stub shaft 11 has been inserted into the bored axle 12 to the extent that the snap ring is positioned at the first groove 16, the snap ring 18 snaps out or expands into the groove 16. Thereby, the snap ring 18, when engaged in the groove 16, prevents axial displacement of the stub shaft 11, and consequently the propshaft 8, in relation to the power take-off unit 6. If, however, the stub shaft 11, during, for example, certain driving circumstances, should be able to overcome the holding force of the snap ring 18 in the first groove 16, it may be axially displaced (i.e., in the rearwards direction of the vehicle 1). However, when the stub shaft 11, and consequently the snap ring 18, has been moved rearwards of the vehicle to the extent that the snap ring 18 comes into the position of the second groove 17, the snap ring 18 will expand and snap into that groove. The power take-off unit 6 and the propshaft 8 will still be engaged, but with a different relative position. Thereby, the second groove 17 serves as a safety feature preventing the stub shaft 11 from being disengaged with the bored axle 12. The length of the stub shaft 11 is also chosen so that it will not fall out of the bored axle 12 even during the worst possible conditions. The diameter of the bored axle 12 rearwards of the second groove 17 is larger than in front of the second groove 17. By this the radial play between the stub shaft 11 and the output axle 12 will be larger when the snap ring 18 is positioned in the second groove 17, as compared to when it is positioned in the first groove 16. This play will, during use of the vehicle, give rise to vibrations and noise, thereby alerting the driver that the all wheel drive system is malfunctioning.

The o-ring 14 is, when the interconnection unit has been assembled, slightly compressed between the stub shaft 11 and the bored axle 12. It thereby serves to axially seal the interconnection unit and also to dampen possible vibrations of the interconnection unit.

Although the present invention has been described in connection with a particular embodiment thereof, it is to be understood that various modifications, alterations and adaptations may be made by those skilled in the art without departing from the spirit and scope. It is for example not necessary to provide the bored axle 12 with two grooves adapted for receiving the snap ring 18. A construction with only one groove may function. Likewise, if desirable, it is possible to utilize more than two grooves, in order to increase the safety.

The sealing and dampening effect that is provided by the o-ring may also be provided by any other suitable means. The interconnection unit is throughout this application described in an all wheel drive system for a vehicle. It is however also possible to find other suitable application areas for this kind of interconnection unit.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A drive system for an all wheel drive vehicle, said drive system comprising:

a power take-off unit adapted to be attached to a powertrain of the all wheel drive vehicle;

a rear drive module;

a propshaft adapted to transmit drive to the rear drive module; and a joint adapted to connect the propshaft and the power take-off unit and adapted to transmit drive force from the power take-off unit to the propshaft, said joint comprising a female-male engagement and a female engagement portion and a male engagement portion that are non-rotatable in relation to each other when said joint is engaged; and a snap ring arranged at the male engagement portion, and a first groove at the female engagement portion, wherein an axial displacement in relation to one another of the female engagement portion and the male engagement portion is prevented by cooperation of the snap ring and said first groove; and a second groove at the female engagement portion, wherein said second groove is axially spaced from said first groove, and positioned rearwards of said first groove in a longitudinal direction of the all wheel drive vehicle, wherein said second groove substantially prevents a further axial displacement of the female engagement portion and the male engagement portion if said snap ring is axially displaced past said first groove in a rearward direction of the longitudinal direction of the all wheel drive vehicle.

2. A drive system according to claim 1, wherein the female engagement portion is integral with a driven member of the power take-off unit.

3. A drive system according to claim 1, wherein the male engagement portion is a stub shaft of the propshaft.

4. A drive system according to claim 1, wherein the male engagement portion is provided with a spline, and the female engagement portion is provided with a corresponding profile.

5. A drive system according to claim 1, wherein a lateral play between said male engagement portion and said female engagement portion is larger when the snap ring of said male engagement portion is positioned at said second groove of said female engagement portion.

6. A drive system according to claim 1, further comprising an o-ring at said male engagement portion.

* * * * *